(12) United States Patent
Krauklis

(10) Patent No.: US 6,959,425 B1
(45) Date of Patent: Oct. 25, 2005

(54) SYSTEM AND METHOD FOR MANAGING A SCALABLE LIST OF ITEMS FOR DISPLAY

(75) Inventor: Ralf Uwe Krauklis, Ottawa (CA)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/464,021

(22) Filed: Dec. 15, 1999

(51) Int. Cl.⁷ ................................................. G06F 3/00

(52) U.S. Cl. ...................................... 715/864; 715/764

(58) Field of Search ................................ 345/733, 751, 345/764, 853–855, 963; 705/8–9; 715/700, 715/864, 866, 762–765, 815, 825, 853–854, 715/961, 967, 968; 717/100, 108–109, 116, 717/153, 165–166; 719/315–316, 328–329, 719/331–332; 707/103 R, 103 Y, 103, 103 Z

(56) References Cited

U.S. PATENT DOCUMENTS

| | | | | |
|---|---|---|---|---|
| 5,528,745 A | * | 6/1996 | King et al. .................. | 345/753 |
| 5,544,302 A | * | 8/1996 | Nguyen ...................... | 345/837 |
| 5,570,109 A | * | 10/1996 | Jenson ....................... | 345/823 |
| 5,634,100 A | * | 5/1997 | Capps ......................... | 345/781 |
| 5,642,490 A | * | 6/1997 | Morgan et al. ............. | 715/762 |
| 5,664,189 A | * | 9/1997 | Wilcox et al. .............. | 707/205 |
| 5,774,119 A | * | 6/1998 | Alimpich et al. ........... | 345/764 |
| 5,778,346 A | * | 7/1998 | Frid-Nielsen et al. ......... | 705/89 |
| 5,855,006 A | * | 12/1998 | Huemoeller et al. ........... | 705/9 |
| 5,873,108 A | * | 2/1999 | Goyal et al. ................ | 345/764 |
| 5,899,979 A | * | 5/1999 | Miller et al. .................... | 705/1 |

(Continued)

FOREIGN PATENT DOCUMENTS

EP 0947921 10/1999

OTHER PUBLICATIONS

Microsoft Windows NT Explorer (2 pages, 1998).*

(Continued)

*Primary Examiner*—Sy D. Luu
(74) *Attorney, Agent, or Firm*—Meyertons Hood Kivlin Kowert & Goetzel, P.C.; B. Noël Kivlin

(57) ABSTRACT

A system and method for managing a scalable list of items for display in a display device of a small footprint device. A client program running in a small footprint device may instantiate a "list container object" and add "list item data objects" to the list container object. The list container object may instantiate a fixed number of "item renderer objects", which are responsible for appropriately displaying the list item data objects. Each item renderer object may correspond to a row in the displayed list. The list container object interfaces with the set of item renderer objects, in order to manage the display of the list. In one embodiment, the item renderer objects are instances of a class that supports an "item renderer interface" that includes methods for interacting with the item renderer objects. Thus, a general framework is described in which any of various types of objects may be displayed, by implementing the item renderer interface methods appropriately for different item renderer object implementations. The list container object may keep track of the set of list item data objects being displayed at any given time. As a user interacts with the list, e.g., by scrolling up or down, the list container object may receive method calls or user interface events indicating the user's action, may determine the new start index for items to display, and may instruct each item renderer object to redisplay the appropriate list item data object, e.g., by calling an item renderer interface method for each item renderer object, passing the corresponding list item data object as a parameter.

17 Claims, 7 Drawing Sheets

U.S. PATENT DOCUMENTS

| | | | | |
|---|---|---|---|---|
| 5,907,704 | A * | 5/1999 | Gudmundson et al. | 717/100 |
| 5,924,098 | A | 7/1999 | Kluge | |
| 5,974,410 | A * | 10/1999 | Copeland et al. | 707/3 |
| 5,990,905 | A | 11/1999 | Chew et al. | |
| 6,034,683 | A * | 3/2000 | Mansour et al. | 345/764 |
| 6,038,542 | A * | 3/2000 | Ruckdashel | 705/1 |
| 6,054,985 | A * | 4/2000 | Morgan et al. | 345/804 |
| 6,054,996 | A * | 4/2000 | Bardon et al. | 345/619 |
| 6,064,975 | A * | 5/2000 | Moon et al. | 345/581 |
| 6,147,687 | A * | 11/2000 | Wanderski | 345/853 |
| 6,216,149 | B1 * | 4/2001 | Conner et al. | 718/100 |
| 6,232,970 | B1 * | 5/2001 | Bodnar et al. | 345/708 |
| 6,236,396 | B1 * | 5/2001 | Jenson et al. | 345/179 |
| 6,411,275 | B1 * | 6/2002 | Hedberg | 345/156 |
| 6,417,874 | B2 * | 7/2002 | Bodnar | 345/854 |
| 6,810,522 | B2 * | 10/2004 | Cook et al. | 719/316 |

OTHER PUBLICATIONS

Pogue, D. (PalmPilot: The Ultimate Guide, 2$^{nd}$ Edition, Jun. 1999; Chapter/Section 1.1.X "PalmPilot Basics", pp. 1-10).*

"Java 2 Platform SE v1.3: Class Canvas," © 1993-2000 Sun Microsystems, Inc., pp. 1-4.

"Swing 1.1 API Specification: Class ListUI," © 1993-1998 Sun Microsystems, Inc., pp. 1-3.

"Swing 1.1 API Specification: Interface ListDataListener," © 1993-1998 Sun Microsystems, Inc., pp. 1-2.

"Swing 1.1 API Specification: Class ListDataEvent," © 1993-1998 Sun Microsystems, Inc., pp. 1-3.

"Swing 1.1 API Specification: Interface ListModel," © 1993-1998 Sun Microsystems, Inc., pp. 1-2.

"Swing 1.1 API Specification: Class ListSelectionEvent," © 1993-1998 Sun Microsystems, Inc., p. 1-3.

"Swing 1.1 API Specification: Interface ListSelectionListener," © 1993-1998 Sun Microsystems, Inc., p. 1.

"Swing 1.1 API Specification: Interface ListSelectionModel," © 1993-1998 Sun Microsystems, Inc., pp. 1-7.

"Java 2 Platform SE v1.3: Class List," © 1993-2000 Sun Microsystems, Inc., pp. 1-19.

"Java 2 Platform SE v1.3: Class ItemEvent," © 1993-2000 Sun Microsystems, Inc., pp. 1-4.

"Java 2 Platform SE v1.3: Interface ItemListener," © 1993-2000 Sun Microsystems, Inc., pp. 1-2.

"Java 2 Platform SE v1.3: Class ActionEvent," © 1993-2000 Sun Microsystems, Inc., pp. 1-5.

"Java 2 Platform SE v1.3: Interface ActionListener," 1993-2000 Sun Microsystems, Inc., pp. 1-2.

*Wireless Application Protocol, Wireless Markup Language Specification*, Apr. 1998, Wireless Application Protocol Forum, Ltd., pp. 1-59.

International search report application No. PCT/US00/34153 mailed Sep. 18, 2003.

Nuno Guimaraes: "Building Generic User Interface Tools: An Experience with Multiple Inheritance", ACM Sigplan Notices, Association for Computing Machinery, New York, US, vol. 26, No. 11, Nov. 1, 1991, p. 89-96, XP000329554, ISSN: 0362-1340, pp. 92.

* cited by examiner

```
              List Item Renderer Object
                        102 public interface ItemRenderer {

/* sets the data to render */
        public void SetData (Object data);

/* gets the data being rendered */
        public Object getData ();

/* sets the visibility state */
        public void setVisible (boolean visible);

/* gets the visibility state */
        public boolean isVisible ();

/* gets the component to which data is rendered */
        public java.awt.Component getRenderComponent ();

SYSTEM AND METHOD FOR MANAGING A SCALABLE LIST OF ITEMS FOR DISPLAY

BACKGROUND OF THE INVENTION

1. Field of the Invention

The present invention relates to the field of graphical user interfaces (GUIs), and more particularly to a system and method for managing a scalable list of items for display in a display device of a small footprint device.

2. Description of the Related Art

Graphical user interfaces (GUIs) enable users to interact with software applications in an intuitive manner, utilizing graphical components or controls, such as buttons, input text fields, menus, etc. Although graphical user interfaces are often associated with software applications that run on general computing devices, such as desktop computers, GUIs are becoming more common in other types of computing devices, such as small footprint devices.

The field of "smart" small footprint devices is growing and changing rapidly. Small footprint devices include handheld computers, personal data assistants (PDAs), cellular phones, global positioning system (GPS) receivers, game consoles, set top boxes, and many more such devices. Small footprint devices are becoming increasingly powerful and enabled to run software applications or services historically associated with general computing devices, such as desktop computers. For example, many small footprint devices are now able to run web browser applications.

As small footprint devices have become more powerful and the software applications running on small footprint devices have become more complex, it has become increasingly feasible and desirable to enable users to easily interact with the applications through graphical user interfaces. However, experience has shown that many techniques commonly used when implementing a GUI intended to run in a resource-rich environment such as a desktop computer have various drawbacks if applied to a GUI intended to run in a small footprint device. Small footprint devices may have very strong resource constraints, such as the amount of memory and the processing power available. Thus, it is often necessary or desirable to design specialized or optimized user interface components that perform well in the environment of a small footprint device.

One type of user interface component or control often supported by graphical user interface systems is a list component or control for displaying a list of items. In various systems or applications, items in a list component may represent any of various types of entities and may be displayed in various ways, e.g., through the use of text strings, icons, background shading, etc., or through various combinations of these. For example, an email client program may use a list component to display a list of e-mail messages, where each item or row in the list represents a particular e-mail message and may be displayed with various icons to indicate the status of the message, such as whether it has already been read, etc.

Such GUI list components are familiar to users of desktop computers. As described above, it may also be desirable to use such a rich GUI list component within the environment of a small footprint device. However, previous approaches to implementing GUI list components often suffer from various drawbacks when the list components are used within a small footprint device environment.

One potential drawback of many previous approaches to implementing GUI list components is that the list components may allocate memory for maintaining information associated with each list item. For example, as each data item is inserted into a list, a list component may create and maintain various user interface structures or other data structures associated with the data item. The use of the information maintained by the list component for each list item may have various benefits, such as making it possible to display the list items faster as a user traverses through the list. However, in a memory-constrained environment, the disadvantage of the extra memory required for each list item may outweigh any potential benefits. Thus, it may be desirable to provide a system and method for displaying list items in a scalable manner, such that, as many items are added to the list, the memory requirements of the list component itself remain constant.

Another potential drawback of some previous approaches to implementing GUI list components is that the list components often provide no control or only limited control over the display or appearance of each list item. For example, a programmer may be limited to setting certain application programming interface (API) attributes controlling the appearance of each list item, while it may be desirable to customize various other aspects of list item display that are unsupported by the API. Also, a list component may be limited in the types of data items or objects it is able to display. It may thus be desirable to provide a system and method for displaying list items such that the rendering or display of each list item may be easily controlled by a client programmer, e.g., to control the way in which a programmer-defined object is displayed to the user.

SUMMARY OF THE INVENTION

The problems outlined above may in large part be solved by a system and method for managing a scalable list of items for display in a display device of a small footprint device, as described herein. A client program running in a small footprint device may instantiate a "list container object". The list container object may provide an API enabling the client program to then add "list item data objects" to the list container object. The list container object may maintain these list item data objects in any of various ways as appropriate to a particular implementation or programming environment, e.g., as an item element vector, array, linked list, etc.

The list container object may instantiate a fixed number of "item renderer objects", which are responsible for appropriately displaying the list item data objects. Each item renderer object may correspond to a row in the displayed list. The list container object interfaces with the set of item renderer objects, in order to manage the display of the list. In one embodiment, the item renderer objects are instances of a class that implements an "item renderer interface". The item renderer interface may include methods, such as SetData( ), GetData( ), etc. for interacting with the item renderer objects. Thus, a general framework is described in which any of various types of objects may be displayed, by implementing the item renderer interface methods appropriately for different item renderer object implementations.

The list container object may keep track of the set of list item data objects being displayed at any given time. In one embodiment, the list container object simply maintains a "start index" specifying which item is currently displayed in the first row of the list. As a user interacts with the list, e.g., by scrolling up or down, the list container object may receive user interface events indicating the user's action, may determine the new start index for items to display, and may instruct each item renderer object to redisplay the appropriate list item data object, e.g., by calling the SetData( ) item renderer interface method for each item renderer object, passing the corresponding list item data object as a parameter.

BRIEF DESCRIPTION OF THE DRAWINGS

Other objects and advantages of the invention will become apparent upon reading the following detailed description and upon reference to the accompanying drawings in which:

FIG. 3 illustrates one embodiment of an item renderer interface implemented by list item renderer objects;

Figure 1:
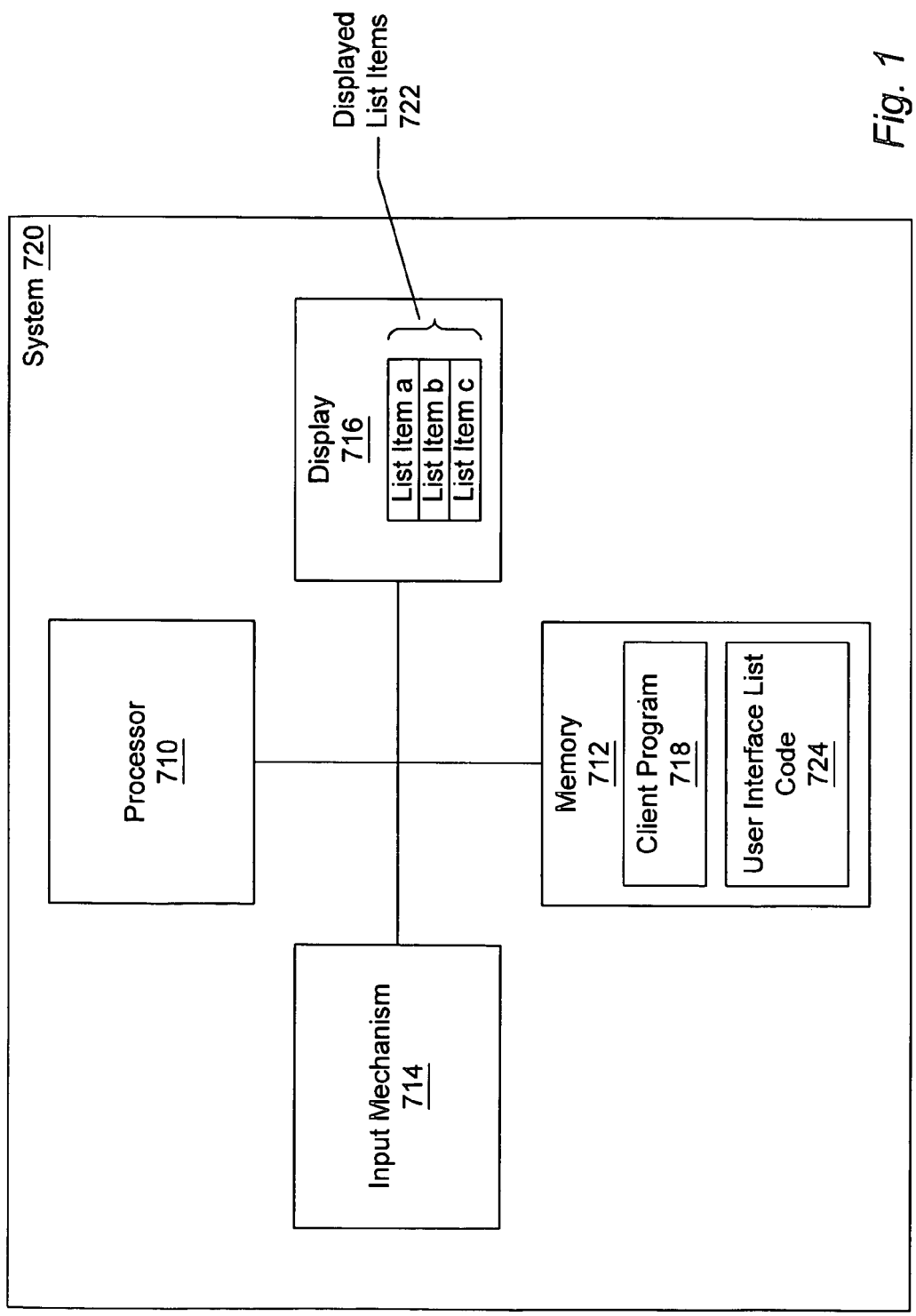
FIG. 1 is a block diagram illustrating one embodiment of a system supporting a scalable user interface list of items.

While the invention is susceptible to various modifications and alternative forms, specific embodiments thereof are shown by way of example in the drawings and will be described herein in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1—Exemplary System

FIG. 1 is a block diagram illustrating one embodiment of a system 720 supporting a scalable user interface list of items. The system 720 may be employed in any of various types of computing devices, such as desktop computers or workstations, small footprint devices, etc.

As shown in FIG. 1, the system 720 may include a processor 710. The processor 710 may be any of various types, including an x86 processor, e.g., a Pentium class, a PowerPC processor, a CPU from the SPARC family of RISC processors, as well as others. In various embodiments, such as an embodiment in which the system 720 illustrates a small footprint device, the processor 710 may be a less powerful processor than those listed above or may be a processor developed specifically for a small footprint device, such as a digital signal processor (DSP). The processor 710 may have various clock speeds, including clock speeds similar to those found in desktop computer-class processors, as well as lower speeds such as 16 MHz.

The system 720 also includes a memory 712 coupled to the processor 710. The memory 712 may comprise any of various types of memory, including DRAM, SRAM, EDO RAM, etc., or a non-volatile memory such as a magnetic media, e.g., a hard drive, or optical storage. The memory 712 may comprise other types of memory as well, or combinations thereof. For an embodiment in which the system 720 illustrates a small footprint device, the memory 712 may have a very small storage capacity compared to a typical desktop computer system.

As shown in FIG. 1, the memory 712 may store code 724 for implementing a scalable list of user interface items. The user interface list code 724 may comprise code, e.g. class definitions or modules, for implementing various objects used in managing the user interface list, such as described below.

The memory 712 may also store a client program 718 that uses the user interface list code 724. For example, the client program 718 may include program instructions for instantiating objects of the user interface list code 724 and invoking methods on the objects, as described below. It is noted that the user interface list code 724 may be tightly coupled with the client program 718. For example, the client program 718 may be an application program, and the user interface list code 724 may be a portion of the code base of the application. However, in other embodiments, the user interface list code 724 may be loosely coupled with the client program 718. For example, the user interface list code may be included in a user interface library for use by any of various client programs.

As shown in FIG. 1, the system 720 may also comprise a display 716. The display 716 may be any of various types, such as an LCD (liquid crystal display), a CRT (cathode ray tube) display, etc. It is noted that the display for a typical small footprint device, such as a smart cellular phone, may be small compared to the display of a desktop computer system. The display 716 is provided to display various information, including lists generated in accordance with the below description.

As shown in FIG. 1, the system 720 may also comprise an input mechanism 714. The input mechanism 714 may be any of various types, as appropriate for a particular system. For example, the input mechanism may be a keyboard, mouse, trackball, touch pen, microphone, modem, infrared receiver, etc.

As noted above, in various embodiments, the system 720 may be illustrative of a small footprint device. As used herein, a small footprint device is a hardware device comprising computing resources such as a processor and a system memory, but having significantly greater constraints on one or more of these resources than a typical desktop computer has. For example, a typical small footprint device may have two megabytes of memory or less, whereas a typical desktop system may have 64 megabytes or more. Also a typical small footprint device may have significantly less processing power than a typical desktop computing system, either in terms of processor type, or processor speed, or both. For example, a particular personal data assistant device may have a 16 MHz processor, whereas a typical desktop system may have a processor speed of 100 MHz or higher. Also, a typical small footprint device may have a display size significantly smaller than the display screen of a desktop computing system. For example, the display screen of a handheld computer is typically small compared to the display screen of a desktop monitor. It is noted that the specific numbers given above are exemplary only and are used for comparison purposes.

Small footprint devices may also have constraints on other resource types compared to typical desktop computing systems, besides the memory, processor, and display size resources described above. For example, a typical small footprint device may not have a hard disk, may not have a network connection, or may have an intermittent network connection, or may have a wireless network connection, etc.

Many small footprint devices are portable and/or are small compared to desktop computers, but are not necessarily so. Also, many small footprint devices are primarily or exclusively battery-operated. Also, small footprint devices may typically have a more limited or narrow range of usage possibilities than a typical desktop computing system. Thus, in various embodiments, the system illustrated in FIG. 1 is illustrative of, but is not limited to, any one of the following: handheld computers, wearable devices (e.g., wristwatch computers), personal data assistants (PDAs), "smart" cellular telephones, set-top boxes, game consoles, global positioning system (GPS) units, electronic textbook devices, etc. Since new classes of consumer devices are rapidly emerging, it is not possible to provide an exhaustive list of small footprint devices. However, the term "small footprint device" is intended to include such devices as may reasonably be included within the spirit and scope of the term as described above.

It is noted that in various embodiments the system and method described herein may also be employed in a general-purpose computer system, such as a desktop PC or mainframe computer.

Figure 2:
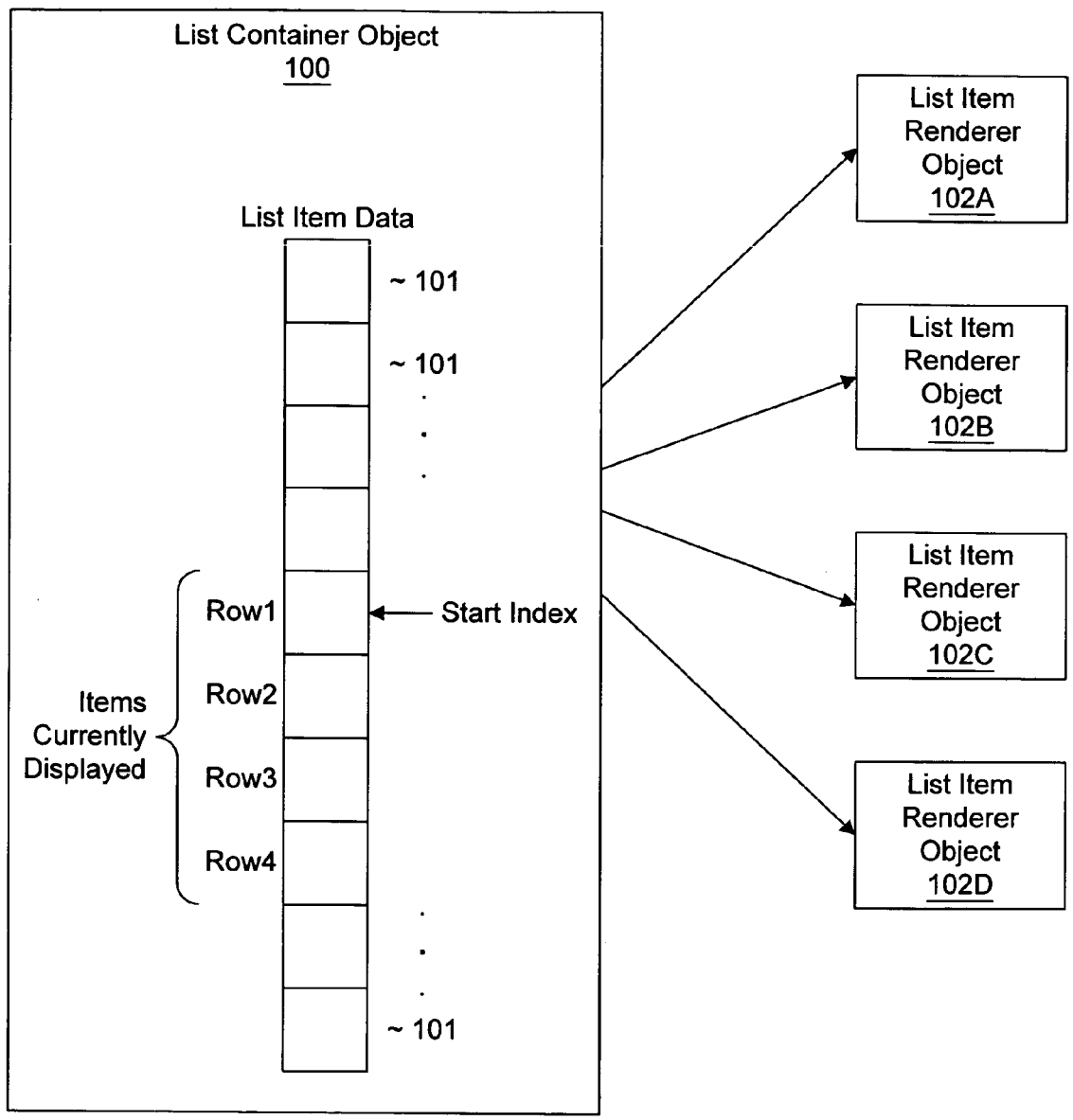
FIG. 2 is a block diagram illustrating one embodiment of a framework for providing a scalable user interface list of items.

FIGS. 2–3: Framework for Providing a Scalable User Interface List of Items

FIG. 2 is a block diagram illustrating one embodiment of a framework for providing a scalable user interface list of items. As described above, the illustrated framework may be implemented within a small footprint device.

The framework illustrated in FIG. 2 includes a list container object 100. A client program may instantiate a list container object 100 and add list item data objects 101 to the list container object 100 via an application programming interface (API) provided by the list container object. The client program may be a client program written using any of various programming languages or development environments. The list container object 100 may be an object implemented in any of various ways and may provide the API to client programs in any of various ways, e.g., as object methods that client programs may invoke. For example, in an embodiment implemented using the Java™ programming language, the list container object may provide a method with a signature such as:
public synchronized void addItem (Object item)

Client programs may then call the addItem( ) method to add list item data objects 101 to the list container 100. The list container may store or maintain the list item data objects 101 in any of various ways, e.g., as a vector, an array, a linked list, etc.

As shown in FIG. 2, at any given time, only a subset of the list item data objects 101 may actually be displayed. The number of items that can be displayed at a given time depends on the size of the list, i.e., the number of "rows" the list container object is configured with. Configuring the list container object with a number of rows is discussed below. For example, if the list container object maintains ten list item data objects but is only configured to have four rows (as illustrated in FIG. 2), then only a subset of the list item data objects may be displayed. The list container object may maintain a "start index" that specifies which of the list item data objects 101 is currently displayed in the first row of the list.

As shown in FIG. 2, the list container object 100 interfaces with a set of list item renderer objects 102A–102D (referred to collectively as list item renderer objects 102).

Each list item renderer object 102 may correspond to a row in the displayed list. For example, in FIG. 2, list item renderer object 102C may correspond to the third row. Each list item renderer object 102 implements code for appropriately displaying a list item data object. The list container object 100 interacts with the list item renderer objects 102 to manage the display of the list.

In one embodiment, the list item renderer objects may be objects including a "set data" method with a signature such as:
public void SetData (Object data)

Thus, the list container object may simply use the start index to retrieve the appropriate list item data object corresponding to each list item renderer object and pass the list item data object to the SetData( ) method for the list item renderer object. For example, in FIG. 2, the list container object may pass the fifth list item data object shown in the figure to the list item renderer object 102A, may pass the sixth list item data object shown in the figure to the list item renderer object 102B, etc.

In response to the SetData( ) method being invoked, the list item renderer objects may display the received list item data object in the user interface, as appropriate for a particular type of list item data object. For example, for list item data objects representing e-mail messages, the list item renderer objects may retrieve information from the message objects, such as the sender's name, the message subject, etc., and may then display this information in the user interface.

In one embodiment, an "item renderer" interface is defined, and list item renderer objects designed to display list item data objects of various types are all expected to implement the item renderer interface. One embodiment of an item renderer interface implemented by list item renderer objects constructed using the Java™ programming language is shown in FIG. 3.

As shown in FIG. 3, the item renderer interface may include the SetData( ) method discussed above, as well as additional methods, such as getData( ), setVisible( ), isVisible( ), getRenderComponent( ), etc.

By standardizing the interface between the list container object and the item renderer objects, the FIG. 2 framework may advantageously be used to display any of various types of list item data objects. The list container may manage the list item data objects and the list item renderer objects independently of the type of list item data objects being displayed, and the type-specific logic may be encapsulated within particular list item renderer object implementations. It is noted that the encapsulation of the type-specific logic within list item renderer objects may offer a program developer an easy way to have full control over how list item data objects are displayed.

The appropriate class for the list item renderer objects may be specified or determined in various ways. In one embodiment, it is the responsibility of the client program to inform the list container object of the appropriate list item renderer class, given the types of the list item data objects. For example, if the client program inserts objects representing e-mail messages into the list container, then the client program may inform the list container object that the appropriate class for the list item renderer objects is a class named, for example, MessageItemRenderer, where the MessageItemRenderer class implements the item renderer interface and comprises code for retrieving information from e-mail message objects and displaying the information. The client program may inform the list container object of the appropriate list item renderer class in any of various ways. For example, the list container object may include a Set- RendererClass( ) method callable by client programs. Embodiments are contemplated in which the list item renderer class may be determined in various other ways, e.g., by determining the class based on information in the list item data objects themselves.

Figure 4:
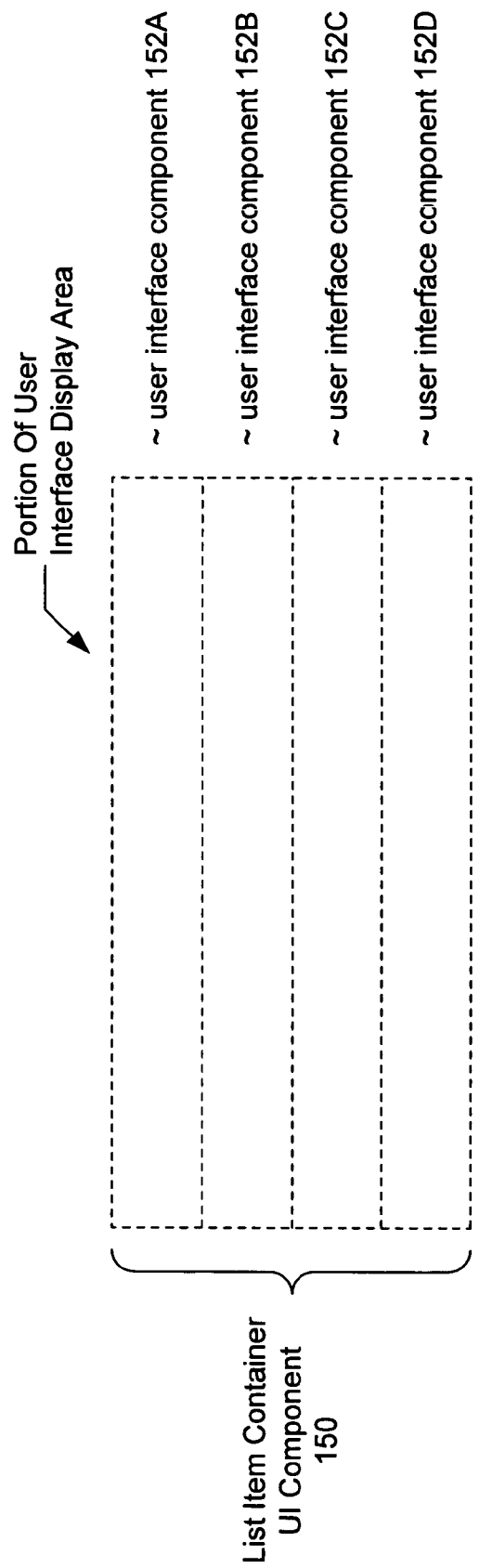
FIG. 4 illustrates the management of portions of the user interface display by user interface components associated with list item renderer objects.

FIG. 4—User Interface Component Usage

List item renderer objects may implement the list item user interface display logic in any of various ways. In one embodiment, the list item renderer objects may utilize pre-existing user interface components or controls in displaying information, e.g., by instantiating user interface objects or inheriting from user interface classes. For example, in an embodiment implemented using the Java™ programming language, list item renderer objects may inherit from a standard Java™ Abstract Window Toolkit (AWT) user interface component, such as a java.awt.Canvas component. Thus, what appears in the user interface display as an integrated user interface list component may actually comprise multiple user interface components.

List item renderer objects may of course utilize any of various types of user interface components as necessary, depending on the type of information to be displayed, the particular user interface components supported for a particular system, etc. In response to the list container object setting the data for the list item renderer objects, each list item renderer object may interface with its associated user interface component to display the data appropriately, e.g., by invoking various paint or draw methods on the user interface component, etc.

As described above, each list item renderer object may correspond to a particular row in the displayed list. Thus, the size of the user interface component associated with each list item renderer object may be set to a size appropriate for controlling an area of the user interface display that corresponds to a particular row of the displayed list. For example, FIG. 4 illustrates a portion of a user interface display that is divided into four rectangular areas, each corresponding to a list row. Each of the areas may be managed by a user interface component associated with a list item renderer object. For example, in FIG. 4, user interface component 152A may be associated with the list item renderer object 102A of FIG. 2, user interface component 152B may be associated with the list item renderer object 102B of FIG. 2, etc.

The list item renderer objects may enable a client program to obtain the associated user interface components. For example, the item renderer interface embodiment illustrated in FIG. 3 shows a getRendererComponent( ) method for obtaining the user interface component associated with a list item renderer object.

As shown in FIG. 4, a list container user interface component 150 may be associated with the list container object, the size of which is set to the size of the entire user interface area covered by the displayed list.

The size of the list and the list rows and the number of rows in the list may be determined in any of various ways. For example, when instantiating a list container object, a client program may specify this information, e.g., by passing the list size and the number of rows as parameters to a constructor function.

Note that the use of pre-existing user interface components or controls may enable the list container to respond to various types of user interface events supported by a particular environment or user interface component. For example, user interface events, such as keypresses, mouse clicks, etc., may be brokered from the list container user interface component 150 to the list container object, enabling the list container object to cause the displayed list to scroll, etc.

Although the above description discusses the display of list item data via the use of pre-existing user interface components or controls, the list item renderer objects may of course implement all of the user interface display logic themselves, if desirable.

Figure 5:
FIG. 5 is a screen shot illustrating an example of user interface list implemented as described herein.

FIG. 5—Exemplary List Display

As discussed above, the system and method described herein may be applied to display any of various types of data items in a user interface list. FIG. 5 is a screen shot illustrating one such user interface list. FIG. 5 illustrates a list with eight rows, each of which displays header information for an email message, such as the name of the sender, the date sent, the size of the message, etc.

The FIG. 5 list appears similar to many common user interface list components. However, the FIG. 5 list is implemented and operates as discussed herein.

Figure 6:
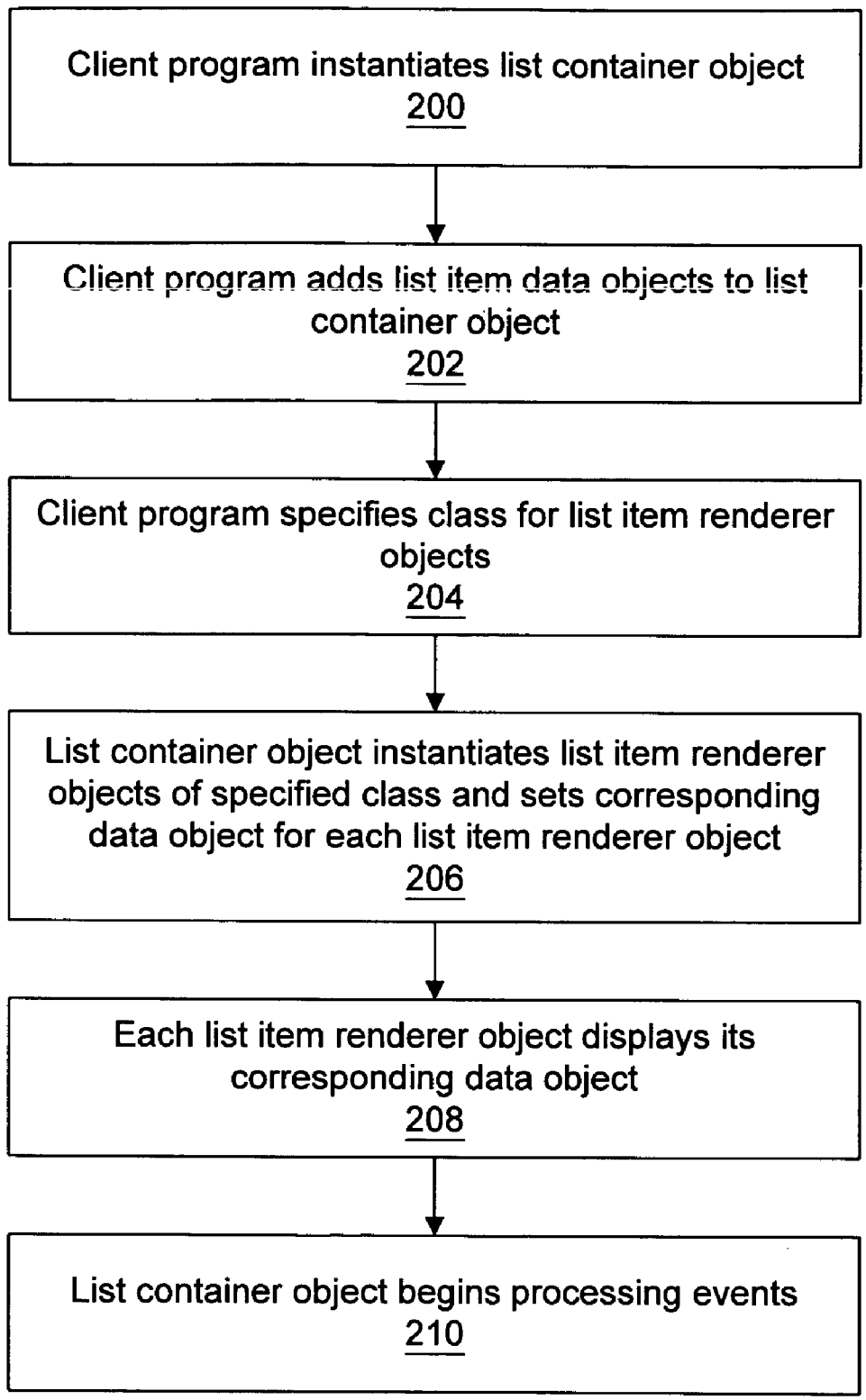
FIG. 6 is a flowchart diagram illustrating one embodiment of a method of creating a list for display in a user interface in accordance with the framework herein.

FIG. 6—Creating a List for Display in a User Interface

FIG. 6 is a flowchart diagram illustrating one embodiment of a method of creating a list for display in a user interface in accordance with the framework described above with reference to FIGS. 2 and 3.

In step 200, a client program instantiates a list container object. Step 200 may be accomplished in any of various ways depending on a particular implementation and programming environment.

In step 202, the client program adds list item data objects to the list container object, as discussed above.

In step 204, the client program specifies an appropriate class for the list item renderer objects to instantiate. As discussed above, the list item renderer objects should be of a class enabled to display the particular list item data objects added in step 202. The client program may specify the list item renderer class, e.g., by calling a SetRendererClass( ) method of the list container object.

In step 206, the list container object instantiates the appropriate number of list item renderer objects of the class specified in step 204. As discussed above, the number of list item renderer objects may correspond to the number of list rows displayed in the user interface. In step 206, the list container object may also set the corresponding data object for each list item renderer object. As discussed above, the list container may simply call a SetData( ) method of each list item renderer object, passing the appropriate list item data object as a parameter. For initial display, the list item data objects passed to the list item renderer objects would typically correspond to the list item data objects at the beginning of the list. For example, for a list with four visible rows, the first four list item data objects may be passed to the list item renderer objects.

In step 208, each list item renderer object displays its corresponding list item data object received in step 206. As discussed above, the list item data objects may be displayed in any of various ways, as appropriate to a particular type of list item data object, application, development platform, etc.

In step 210, the list container object begins processing events, such as user interface events. For example, the list container object may receive and process events representing various user actions, such as scrolling through the list. For such an event, the list container may then update the list display as described below.

As noted above, FIG. 6 represents one embodiment of a method of creating a list for display in a user interface, and various steps of FIG. 6 may be added, omitted, combined, altered, performed in different orders, etc. For example, FIG. 6 is discussed in terms of adding list item data objects to the list container object in a single step. However, the list item data objects may of course be added to the list container at any of various points during operation of the list.

As another example, the class determination of the list item renderer objects and the list item renderer object instantiation steps may be performed in various ways other than shown in FIG. 6. For example, the list container object may interface with another object that determines the appropriate class of list item renderer objects to instantiate, manages the object instantiations, etc.

Figure 7:
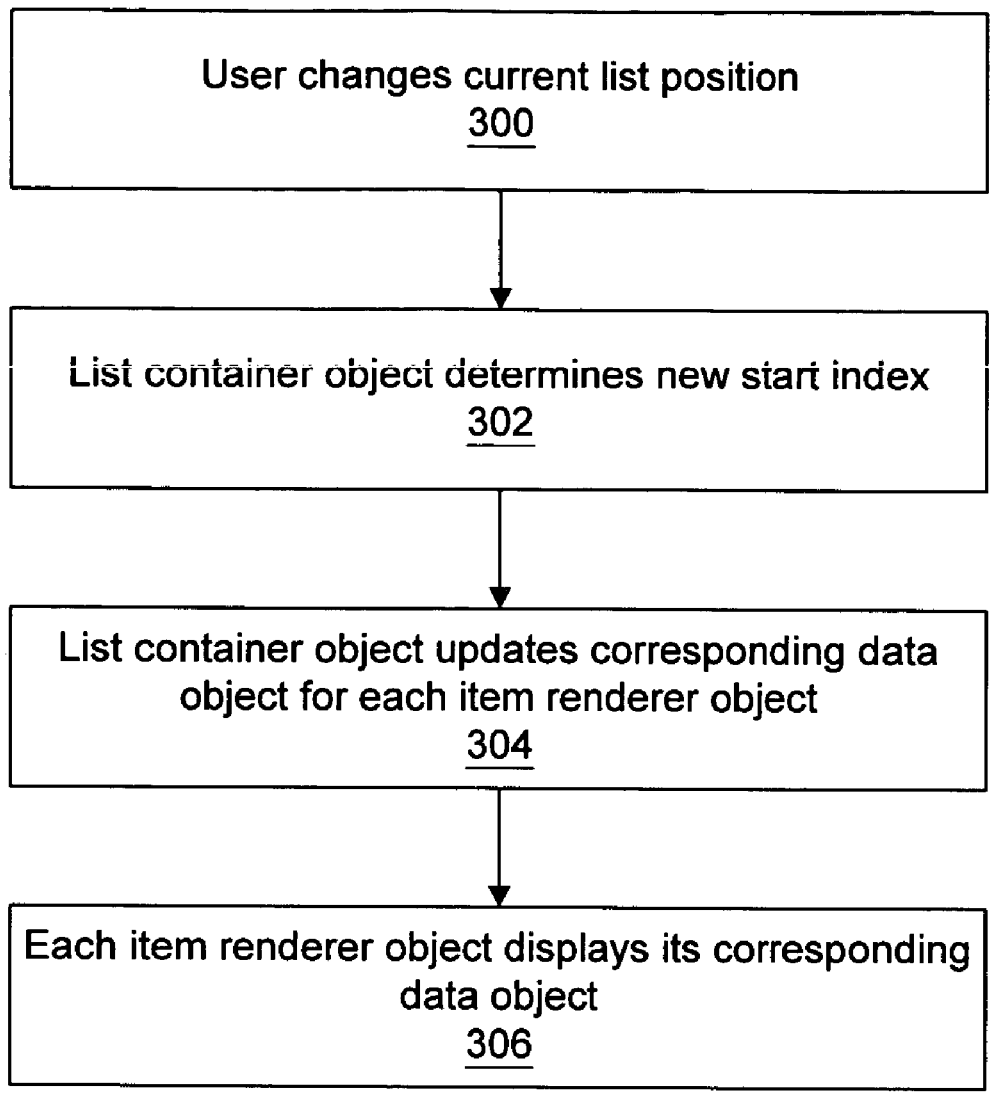
FIG. 7 is a flowchart diagram illustrating one embodiment of managing the dynamic operation of a user interface list.

FIG. 7—Dynamic Operation of List

FIG. 7 is a flowchart diagram illustrating one embodiment of managing the dynamic operation of a user interface list.

In step 300, the user changes the current list position. The user may change the current list position in any of various ways as supported by the user interface and the list container object. For example, as shown in the FIG. 5 example, the user interface may include buttons such as the "Up" and "Down" buttons shown. When a user clicks one of these buttons, the client program may be operable to instruct the list container to move up or down. For example, in one embodiment the list container may provide methods such as:
public synchronized void scrollPageUp( )
public synchronized void scrollPageDown( )

The client program may then call these list container methods as appropriate.

The list container object itself may also be configured to receive and respond to various user interface events. For example, as discussed above, the list container object may be based on a user interface object that supports these capabilities.

In step 302, the list container object determines the new start index for the list, based on the action performed in step 300. As discussed above with reference to FIG. 2, the list container may maintain a start index that specifies the first list item data object being displayed at any given time. In step 302, the list container object may update this start index as appropriate. For example, if the user scrolled down a page in step 300, then the list container may simply increase the start index, e.g., by adding the number of list rows displayed to the start index.

Once the start index has been updated, the list rows are re-displayed in step 304. The list container object may simply use the start index to retrieve the corresponding list item data object for each list item renderer object, and then inform the list item renderer object of the new data to be displayed, e.g., by calling the renderer object's SetData( ) method as discussed above.

In step 306, each list item renderer object displays its updated list item data object, similarly as discussed above.

As noted above, FIG. 7 represents one embodiment of a method for managing the dynamic operation of the list, and various steps of FIG. 7 may be added, omitted, combined, altered, performed in different orders, etc. For example, step 300 of FIG. 7 is discussed in terms of a user initiating a change in the current list position. Such a change in the list position may of course also be caused programmatically.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for managing a scalable list of items for display, the system comprising:
   a small footprint device including a display device and a CPU coupled to a memory;
   a client program comprised in the memory of the small footprint device, wherein the client program is executable to instantiate a list container object and add list item data objects to the list container object;
   wherein the list container object is executable to specify a corresponding list item data object for each of a plurality of list item renderer objects;
   wherein, in response to said list container object specifying a corresponding list item data object for each list item renderer object, each list item renderer object is executable to display the list item data object in the display device of the small footprint device.

2. The system of claim 1, wherein the list container object is executable to instantiate the plurality of list item renderer objects.

3. The system of claim 2, wherein the client program is executable to provide the list container object with information specifying a list item renderer object class;
   wherein said list container object instantiating a plurality of list item renderer objects comprises the list container object instantiating a plurality of objects of the list item renderer object class specified by the client program.

4. The system of claim 3,
   wherein the list item renderer object class implements an item renderer interface;
   wherein the item renderer interface includes a "set data" method to set the list item data object corresponding to a list item renderer object;
   wherein said list container object specifying a corresponding list item data object for each list item renderer object comprises the list container object passing the corresponding list item data object to the "set data" method for each list item renderer object.

5. The system of claim 1,
   wherein the list container object maintains a start index specifying the first list item data object currently being displayed;
   wherein, in response to user interaction, the list container object is executable to update the start index and specify an updated list item data object corresponding to each of the plurality of list item renderer objects;
   wherein, in response to said list container object specifying an updated list item data object corresponding to each list item renderer object, each list item renderer object is executable to display the updated list item data object in the display device of the small footprint device.

6. The system of claim 1,
   wherein each of the plurality of list item renderer objects corresponds to a list row displayed in the display device of the small footprint device;
   wherein said each list item renderer object displaying the list item data object in the display device of the small footprint device comprises each list item renderer object displaying the list item data object in the list row corresponding to the list item renderer object.

7. A method for managing a scalable list of items for display in a display device of a small footprint device, the method comprising:
   a client program comprised in the memory of the small footprint device including a CPU and memory instantiating a list container object and adding list item data objects to the list container object;

the list container object instantiating the plurality of list item renderer objects and specifying a corresponding list item data object for each of a plurality of list item renderer objects;

in response to said list container object specifying a corresponding list item data object for each list item renderer object, each list item renderer object displaying the list item data object in the display device of the small footprint device.

8. The method of claim 7, further comprising:

the client program providing the list container object with information specifying a list item renderer object class;

wherein said list container object instantiating a plurality of list item renderer objects comprises the list container object instantiating a plurality of objects of the list item renderer object class specified by the client program.

9. The method of claim 8, wherein the list item renderer object class implements an item renderer interface;

wherein the item renderer interface includes a "set data" method to set the list item data object corresponding to a list item renderer object;

wherein said list container object specifying a corresponding list item data object for each list item renderer object comprises the list container object passing the corresponding list item data object to the "set data" method for each list item renderer object.

10. The method of claim 7, further comprising:

the list container object maintaining a start index specifying the first list item data object currently being displayed;

in response to user interaction, the list container object updating the start index and specifying an updated list item data object corresponding to each of the plurality of list item renderer objects;

in response to said list container object specifying an updated list item data object corresponding to each list item renderer object, each list item renderer object displaying the updated list item data object in the display device of the small footprint device.

11. The method of claim 7, wherein each of the plurality of list item renderer objects corresponds to a list row displayed in the display device of the small footprint device;

wherein said each list item renderer object displaying the list item data object in the display device of the small footprint device comprises each list item renderer object displaying the list item data object in the list row corresponding to the list item renderer object.

12. A system comprising:

a central processing unit (CPU);

memory coupled to the CPU;

a display device;

a client program comprised in the memory, wherein the client program is executable to instantiate a list container object and add list item data objects to the list container object;

wherein the list container object is executable to specify a corresponding list item data object for each of a plurality of list item renderer objects;

wherein, in response to said list container object specifying a corresponding list item data object for each list item renderer object, each list item renderer object is executable to display the list item data object in the display device.

13. The system of claim 12, wherein the list container object is executable to instantiate the plurality of list item renderer objects.

14. The system of claim 13, wherein the client program is executable to provide the list container object with information specifying a list item renderer object class;

wherein said list container object instantiating a plurality of list item renderer objects comprises the list container object instantiating a plurality of objects of the list item renderer object class specified by the client program.

15. The system of claim 14, wherein the list item renderer object class implements an item renderer interface;

wherein the item renderer interface includes a "set data" method to set the list item data object corresponding to a list item renderer object;

wherein said list container object specifying a corresponding list item data object for each list item renderer object comprises the list container object passing the corresponding list item data object to the "set data" method for each list item renderer object.

16. The system of claim 12, wherein the CPU, memory, and display device are included within a small footprint device.

17. A memory medium comprising program instructions which implement:

a list container object specifying a corresponding list item data object for each of a plurality of list item renderer objects, the list container object instantiating the plurality of list item renderer objects;

in response to said list container object specifying a corresponding list item data object for each list item renderer object, each list item renderer object displaying the list item data object in a display device of a system.

* * * * *